United States Patent Office 3,551,060
Patented Dec. 29, 1970

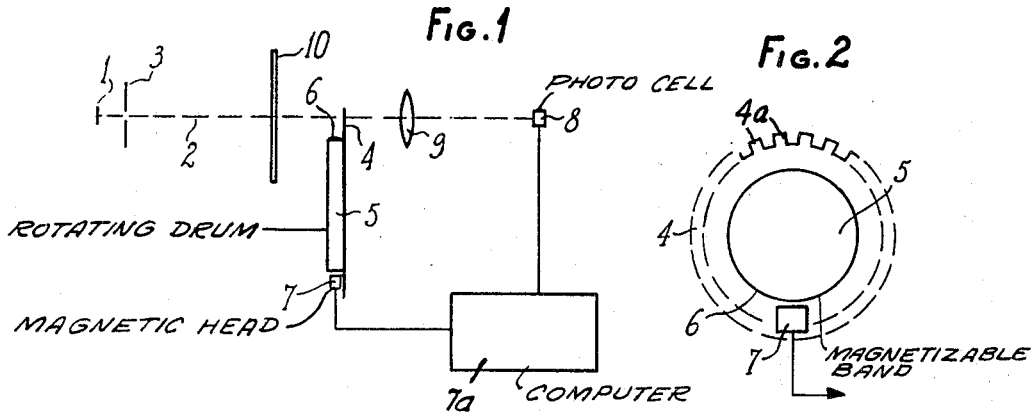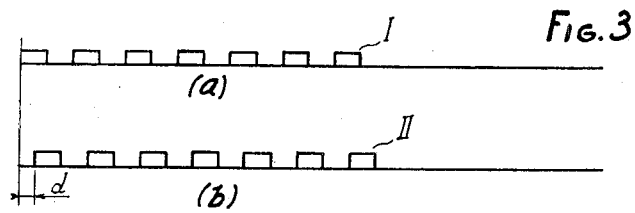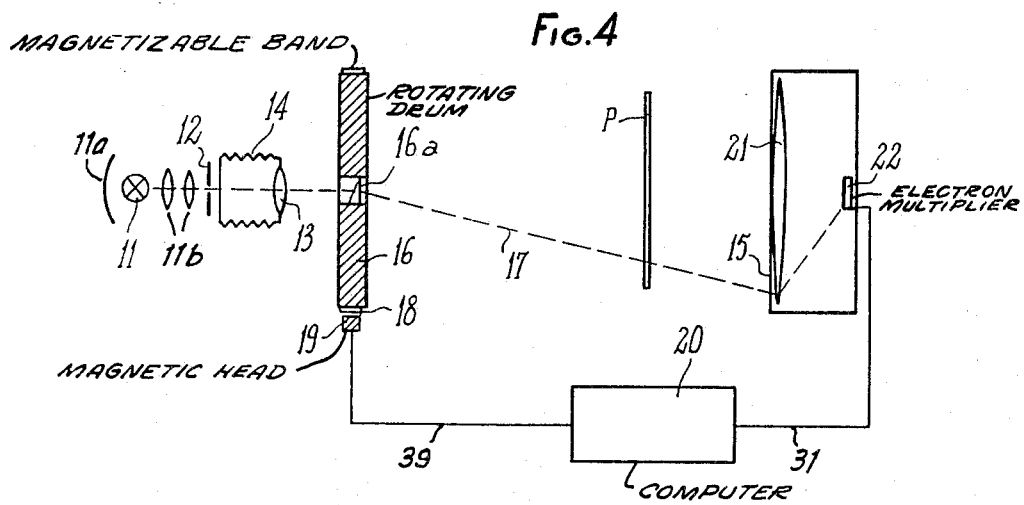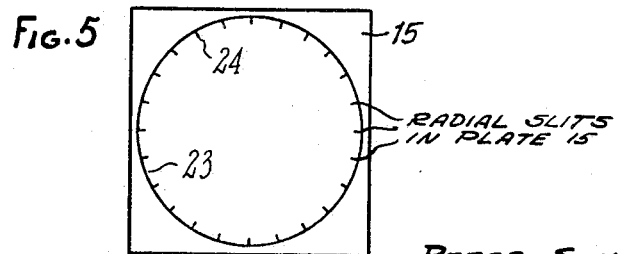

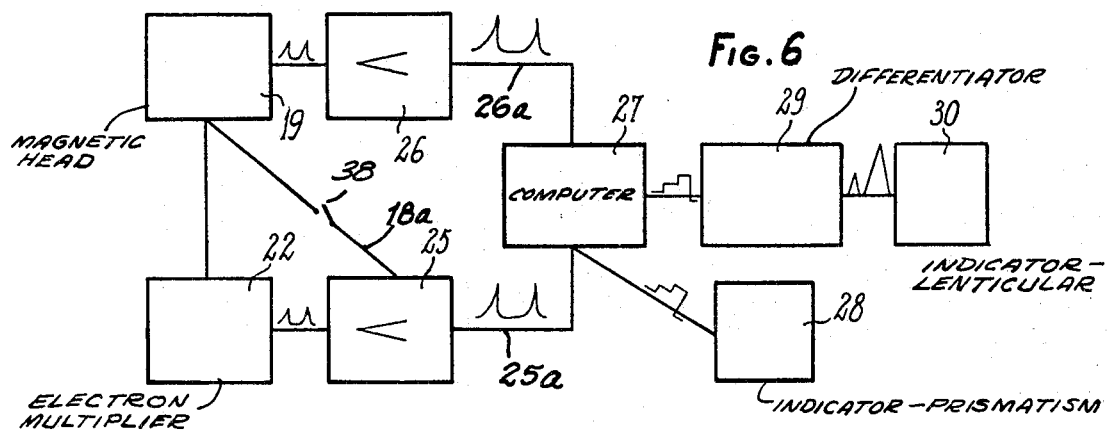
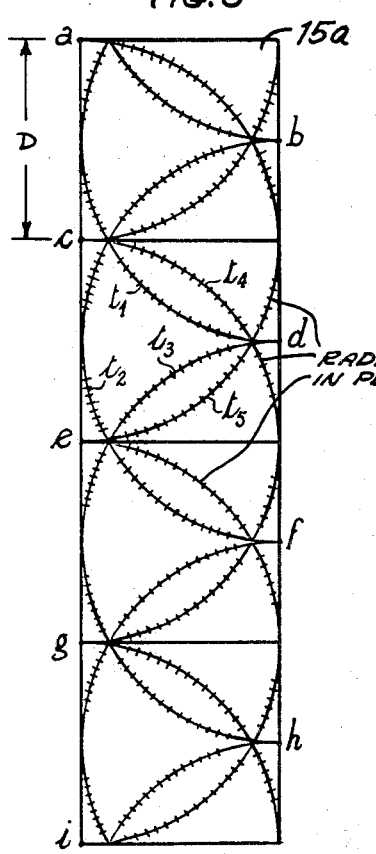
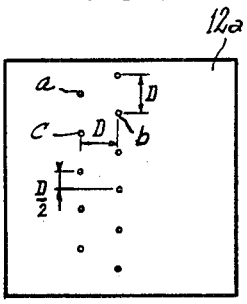
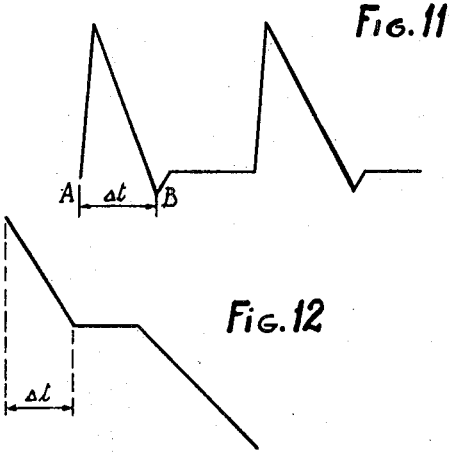
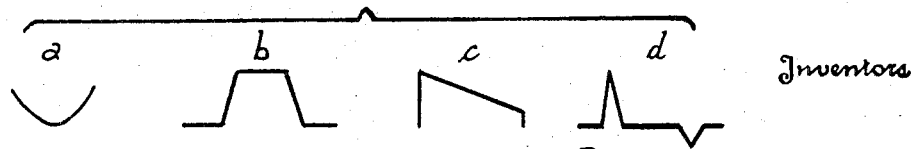

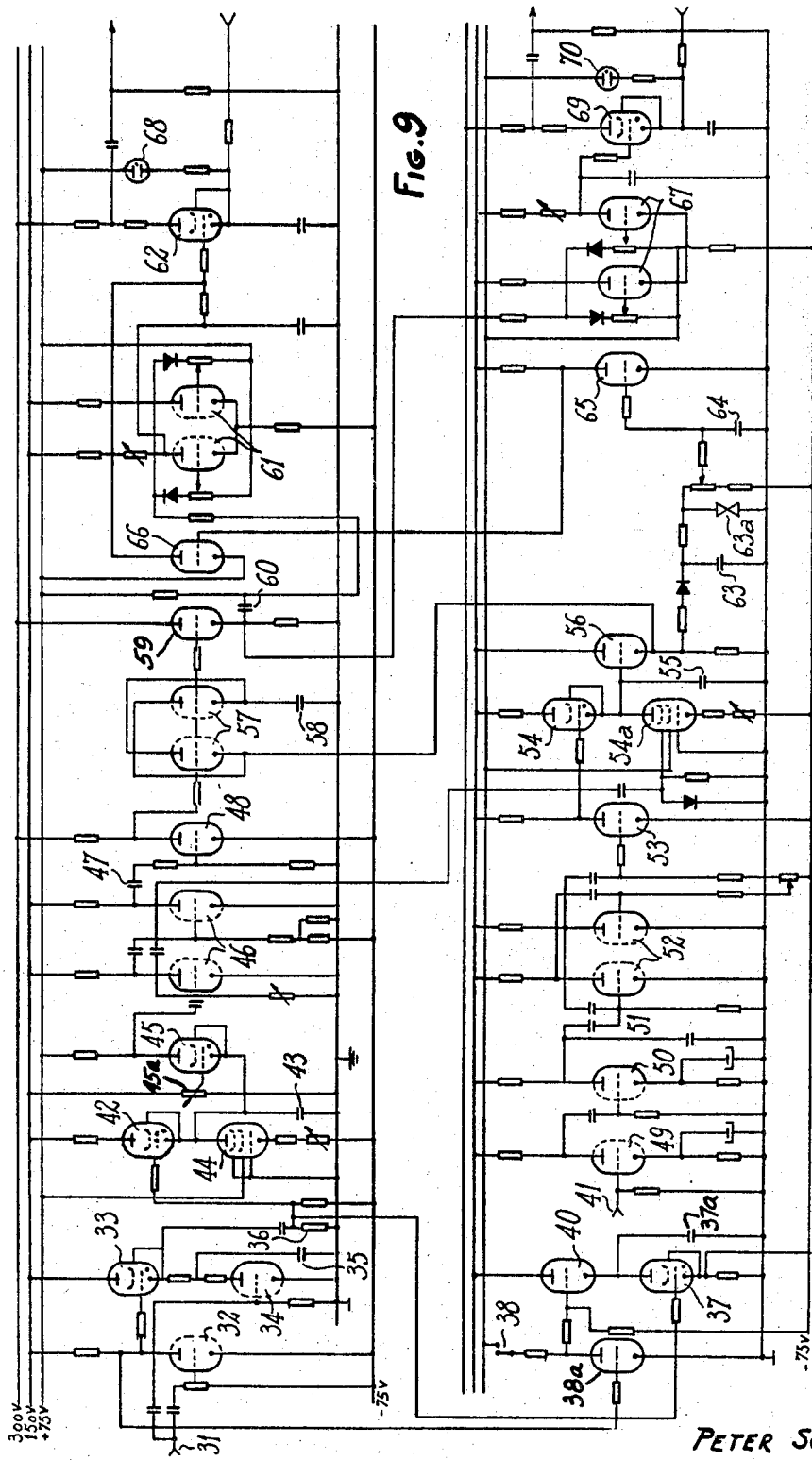

3,551,060
PROCESS AND APPARATUS FOR DETECTING DEFECTS OF SURFACE SHEET MATERIAL
Peter Scheffler, Innsbruck, Austria, and Otto Jandeleit, Aix-la-Chapelle, Germany, assignors to Compagnie de Saint-Gobain, Neuilly-sur-Seine, Hauts-de-Seine, France
Filed Oct. 14, 1965, Ser. No. 496,111
Claims priority, application France, Oct. 19, 1964, 991,882
Int. Cl. G01n 21/32
U.S. Cl. 356—239
12 Claims

ABSTRACT OF THE DISCLOSURE

Method and apparatus for testing sheet glass for parallelism of its surfaces and for true planarity of those surfaces. A beam of light is projected along an axis and is incident upon a prism rotating a known speed about the axis and in synchronism with a magnetizable band moving adjacent an inscription and reading head. The ray deviated by the prism passes through a standard or "perfect" glass sheet and is picked up as a series of uniform and uniformly-spaced pulses which after amplification are applied as spaced magnetized spots to the band. Thereafter the test sheet or specimen is substituted for the standard sheet. When the prism is again rotated within the ray there are produced two sets of pulses which are applied to a computer providing an output signal of any phase difference between the pulses of the two sets. Any difference is conveyed to a register as a measure of the prismatism or lack of parallelism of the two surfaces of the area of the specimen under investigation. The phase difference is also differentiated and conveyed to a second register as a measure of the lenticular power or deviation from true planarity of the surfaces of the test specimen at the area under investigation. The invention comprehends traversing the test area with light rays traversing a multiplicity of angularly-related paths to thus afford a reliable test of the maximum values of prismatism and lenticular power at that area.

---

This invention relates to a method of and an apparatus for measuring the deviation of a ray of light with respect to a base line or reference direction, and especially to deviations which are small and not otherwise readily detachable. While not limited to any particular use, the invention is of great utility in detecting and determining the deviation of a ray of light as the result of its passage through a sheet of glass, as a function of its optical qualities.

It is the chief object of the invention to provide a method and apparatus as aforesaid, by which the deviation of a ray of light in its passage through a sheet of glass, and in correlation with the angle of deviation, enables an accurate appraisal of the quality of the glass.

It is, of course, a prime desideratum in a sheet of glass, that the two surfaces thereof be as nearly in true parallelism as possible. More particularly, therefore, it is an object to determine the deviation from true parallelism of the two faces of the sheet at a selected or test area.

Since it is also highly desirable that each face or surface of the sheet be as nearly perfectly planar and homogenous as possible, a further object is to determine the deviations from perfect uniformity of a sheet of glass, by determination of the extent of deviation of a ray of light projected through the sheet at the area under investigation or test.

The glass-making industry recognizes the defect of sheet glass due to lack of parallelism between the two faces thereof at any given elementary area or, conversely, the angular relation although small, between those faces. This is because lack of parallelism causes the affected area to act as a prism. Therefore, a further object is to provide a method and an apparatus which operate upon the principle that a sheet of glass having faces with opposite elementary areas not precisely parallel or, conversely, making a small angle with one another, acts as a small prism which refracts a ray of light traversing the area under investigation, by an amount or angle proportional to the angle which the two opposed faces make with one another.

Yet another object is to provide a method and apparatus of the nature aforesaid, wherein defects of increments of refractive index of area of a sheet of glass may be ascertained, due to the fact that such an area when not truly planar, acts as a small lens and hence by measuring or determining the degree of divergence or convergence of rays of light traversing the area under investigation, the seriousness of any defect therein may be appraised to decide whether or not the area is commercially acceptable or, on the other hand, if it should be discarded or rejected.

The defects as aforesaid, due to lenticular power may be considered from a mathematical viewpoint, as a continuation of the defect of prismatism. Therefore the amplitude of this lenticular power may be considered as the derivative of the function representing such variation, that is to say, the derivative of the angle of deviation.

The permissible defects in sheets of glass used in the windows of habitations and in automobiles, are measured in minutes of angle between opposite prismatic faces, and in hundredths of a diopter in convergence or divergence of lenticular power. Consequently it is another object of the invention to provide an apparatus of great sensitivity, capable of accurately measuring, detecting or determining such small values.

Still another object is to provide an apparatus which enables the determination to a high degree of accuracy, of the very small deflection of a ray of light traversing a sheet of glass, from its normal or undeviated position, that is, its position after traversing an area of glass with perfectly plane and parallel surfaces.

Ancillary to the object stated in the preceding paragraph, it is a further object to provide an apparatus which may be used to automatically signal when an area is scanned having defects such that that area must be eliminated or rejected, and which may also be used to additionally mark or otherwise to positively identify such area.

More specifically, it is an object for examining a plane optical object such as a sheet of glass, to provide an apparatus which creates a scanning by a beam of rays almost normal to the surface to be examined, with respect to a receiver of such rays, and to measure the time differences between the impact upon the receiver, of the non-deviated rays and the corresponding deviated rays by the defects of the sheet.

Another object is to provide an apparatus wherein the impingement of the non-deviated ray and the deviated ray, upon a receiver responsive to optical signals, are converted to electrical signals by which the aforesaid difference in time may be measured, determined or ascertained. Of course it is possible alternatively, to displace the receiver relatively to the rays and to measure the displacement thereof, or to displace the rays relatively to the receiver, as will be subsequently explained.

One difficulty in carrying the method into practice was that where the two rays are propagated simultaneously, the reference ray which should pass to the receiver without deviation, was affected by conditions similar to those causing deviation of the other or secondary ray. It is therefore a further object of the invention to provide an apparatus incorporating a memory device which retains the signal effected by the reference ray, based upon a perfect condition, or non-deviated position, and which repeats this signal when this deviated or secondary ray is received, in order to thus facilitate measurement of the deviation of the secondary ray by comparison.

Elucidating upon the foregoing object, it is a further object to conserve, by the aforesaid memory device, the signal obtained from the reference or undeviated ray, then to place the area under investigation such, for example, as the area of a sheet of glass to be examined, in the path of this principal ray, and to determine the resulting deviation of the same. Thus the invention enables the determination of the time difference between impingement or incidence of the two rays upon the receiver, and at the same time, the deviation of the secondary ray with respect to the principal ray, exactly as though the two rays had been propagated simultaneously.

Yet another object is to provide electronic circuitry by which the foregoing objects may be rapidly and accurately attained int accordance with the requirements of production line and automated procedures.

Other objects and advantages will become clear to those skilled in the art, after a study of the following detailed description, in connection with the accompanying drawing showing one nonlimiting embodiment of the invention and which, for clarity of description only, will be described in connection with the determination of defects in sheets of glass, especially those due to prismatism and lenticular power.

In the drawing:

FIGURE 1 is a schematic view in side elevation, of one form of the apparatus used to practice the invention, and wherein the rays are fixed;

FIGURE 2 is a front elevation of the rotary slotted disc forming one of the elements of the apparatus of FIGURE 1;

FIGURE 3 is a diagrammatic view showing the relative displacements of the signals produced by the principal and secondary rays;

FIGURE 4 shows schematically and in side elevation, a form of apparatus wherein the rays revolve, and which is alternative to the form shown upon FIGURES 1 and 2;

FIGURE 5 is an elevational view of a light ray received provided with slits and in the form of a circular plate;

FIGURE 6 is a block diagram of the circuitry by which signals from the apparatus of FIGURE 4 are employed to carry the method into effect, and showing the wave form from the outlet of each unit;

FIGURE 7 shows a multi-apertured plate used to produce scanning of an area of a sheet of glass over a plurality of discrete paths;

FIGURE 8 is a view illustrating a pre-selected pattern of scanning paths such as might be produced by the apertures of the plate of FIGURE 7;

FIGURE 8a shows the projected pattern of scanning rays effected by the plate of FIGURE 7a;

FIGURE 9 shows the complete electronic circuitry for carrying the method into practice; and FIGURES 10, 11 and 12 show various forms of the signal at different stages of amplification and filtering.

Figure 8A:
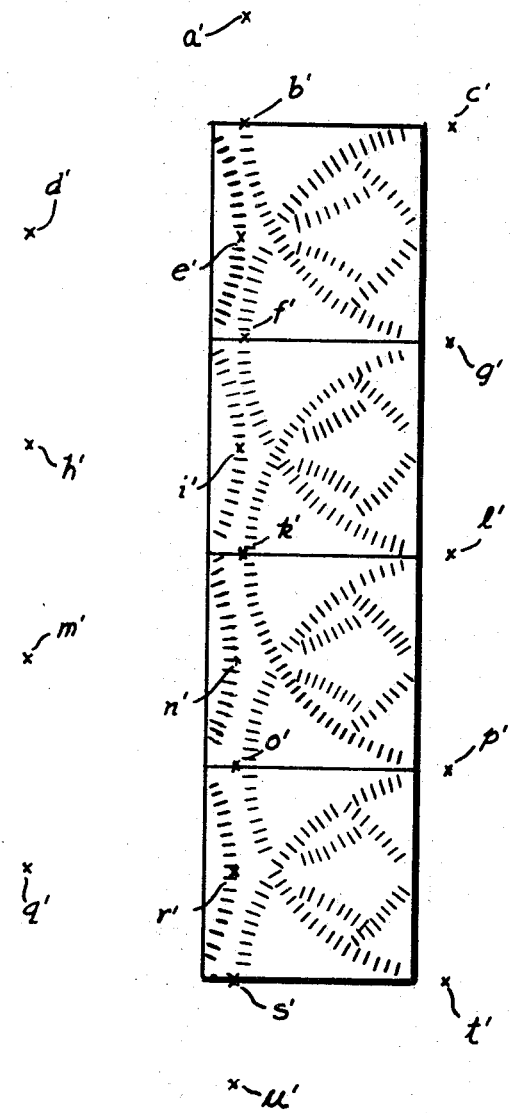

Referring in detail to the drawing, 1, FIGURE 1, represents a source of light from which there is emitted a ray 2, passing through an aperture in diaphragm 3. After passing the aperture, the ray is periodically intercepted by teeth 4a formed in the periphery of a disk 4 rotated at constant known speed. As shown upon FIGURE 2, the teeth are uniformly angularly spaced and of equal angular extent. A drum 5 is fixed with disk 4, coaxially thereof and has a band or tape of magnetic material fixed to its peripheral wall. A magnetic head or pick-off 7 is fixedly mounted adjacent to band 6, in such a way that the inscription of signals in the band and their reading therefrom may be effected. After passing a slot formed between two consecutive teeth 4a, the ray traverses a converging lens 9 and impinges upon a photoelectric cell 8. The purpose of the lens is to concentrate the light upon the cell. Disk 4 which performs the relative displacement of the receiver of the light ray, is, as previously stated, rotated at constant speed by a source of power not shown, and as a result cell 8 supplies a pulsed voltage of a form represented at (a), FIGURE 3.

When a transparent sheet or pane 10 to be examined, is emplaced as shown upon FIGURE 1, in event there is a defect in the area traversed by ray 2, the latter is deviated. The component of deviations of the path of the ray in the plane of disk 4, parallel to the displacement of the notches receiving the rays, causes a phase shift of the voltage produced by cell 8, as indicated for example at (b), FIGURE 3. If the phase difference between the current produced in head 7 by a magnetized spot on band 6, induced by a reference or undeviated ray, and the current produced by rays deviated by pane or sheet 10, is determined by known means indicated at 7a, FIGURE 1, the difference, such as indicated at d, FIGURE 3, is closely proportional to the value of the tangential component of displacement of the path of the rays by the sheet.

In order to obtain a reading proportional to the value of the greatest deviation caused by the area of sheet 10 being examined, the sheet may be turned about ray 2 as an axis until the maximum phase difference is found.

Simplified apparatus thus disclosed in connection with FIGURES 1 to 3, in order to illustrate the principle of the invention, do not enable readings sufficiently rapid for industrial purposes. In connection with FIGURE 4 however, there is disclosed an improved form readily adapted to commercial use.

A light source 11, provided with a concave reflector 11a and condensing lens system 11b produces a beam of parallel rays which pass through an aperture of a few hundredths of a millimeter in diameter in a plate 12. An objective 13 is positioned within and at the forward end of a hood 14 and provides an image of the aperture upon a slitted plate 15. For clear and distinct signals it is necessary that the definition of this image upon the plate, be as distinct as possible.

A drum 16 centered on the optical axis of the apparatus, normal thereto, and rotated at constant speed from a source of power not shown, has a central orifice within which a prism 16a is secured. The prism may have an angle of about 7°30′ and is so disposed within the orifice that its face from which the rays emerge is perpendicular to the incident rays. With such an arrangement there is materialized the condition of minimum deflection of about 3°. This has the advantage of rendering the angle of the emerging rays, with respect to the optical axis of the instrument, relatively free of influence by displacements of the prism which may be caused by play or wear of the moving parts and vibrations thereof. There is thus obtained an emergent ray 17 of particular stability and steadiness. When drum 16 rotates on its axis, the emergent ray describes the surface of cone whose axis is coincident with the optical axis of the instrument.

A magnetic band or tape 18 is fixed to and about the periphery of drum 16 and acts to record impulses corresponding to those produced by rays which are not deviated by a specimen or transparent sheet under examination. A magnetic recording and detecting head 19 is fixed adjacent band 18, for inducing magnetic spots therein and for sensing the same. This head is electrically connected with an electronic assembly or computer generally identified at 20, and subsequently described.

A Fresnel lens 21 is positioned rearwardly of slitted plate 15 and acts to direct the rays 17 in all positions, onto an electron multiplier 22, FIGS. 4 and 6.

The magnetic tape or band 18 and electron multiplier 22 are schematically indicated upon FIG. 6. The signals from element 22 are amplified at 25 and the output applied over line 25a to electronic computer 27. Likewise the signals induced in head 19 by magnetic tape or band 18, are amplified at 26 and conveyed over line 26a to computer 27. The amplifiers 25 and 26 may have an amplification factor of from about 100 to 1000. Computer 27 determines the time lag between the two signals from amplifiers 25 and 26, respectively, and applies a signal proportional to such difference, to an indicator 28, such as a cathode ray tube, etc. It is also possible to sample a series of such differences and apply them to a differentiating circuit 29 which, in determining the variation which, as has been stated are proportional to defects due to lenticular power, may control a second register 30.

The apparatus is calibrated by positioning at P, FIG. 4, in place of the object or sheet to be examined, a perfect sheet of glass, that is, one essentially free of the defects which the instrument is to detect. The signals correspondingly produced by electron multiplier 22, are amplified at 25, then conveyed over a line 18a including a presently-closed switch 38, to band 18 to induce magnetic spots therein and thus form a reference scale. Switch 38 is then opened to disconnect band 18 from amplifier 25.

Next, the calibrating sheet is removed from its position at P, FIG. 4, and there is substituted a sheet to be tested, a supposedly plane sheet of glass, for example. The memory device constituted by band 18 is rotated in precise synchronism with the rotation of ray 17 because, in the apparatus disclosed, magnetic band 18 is in fixed relation with prism 16a by reason of their connection to a common drum 16. Thus these maintain absolutely and at all times, the same relative position. This feature is important in view of the high degree of precision required. Of course it is possible to assure the synchronization by mechanical or electronic means other than those shown.

The pulsed signals derived from multiplier 22, amplified at 25, are conveyed over line 25a to computer 27. At the same time the pulsed base signals previously recorded in magnetic band 18 are detected in pick-off 19, amplified at 26 and conveyed over line 26a to the computer, which has a high level of resolution of the order of 1 megahertz in order to distinguish clearly between the signals coming from head 18 and those from multiplier 22. These signals, as will be understood, correspond respectively to the theoretical position of ray 17 for a perfect sheet, and the actual position thereof for the sheet under test. The computer thus determines the time difference between passage of the two signals through one and the same slit 24 in plate 15. The form of these signals is irregular so that it is preferable to transform them by appropriate means, to signals of a form more readily utilized, such as a univibrator, for example, producing signals of square form.

The output of computer 27 is applied to two discrete circuits. One of these is an indicator or register 28 which gives to a high degree of accuracy, the prismatic value of the area of the sheet under test. The other comprises a second calculator 29 which supplies the derivative of the deviations, that is, the lenticular power of the area of the sheet under test, and which is registered by a device 30.

It is also possible and contemplated that the signals from instruments 28 and 30 may be utilized by means of relays, to energize warning signals or devices for automatically rejecting or ejecting from a production line, a sheet of glass for example, when the defect detected therein is in excess of a predetermined limiting and commercially acceptable value. It is not necessary that the trace of ray 17 be circular. In fact it may be rectilinear or elliptical, so long as its speed be perfectly reproducible, because the method is predicated upon the comparison of two discrete values or parameters. It is also possible to use an apparatus the reverse of that shown, wherein, instead of using a moving ray 17 and a fixed receiver, the ray remains fixed and the photomultiplier moves to scan the paths of two discrete lines corresponding respectively to the positions of the ray in its normal and deflected paths. By the term "normal" is meant the path of the ray when traversing an area of a sheet which is essentially perfect from the viewpoint of commercial acceptability.

The apparatus as thus far described, while very useful, is capable of measuring or testing only the component of deviation of the ray in the direction of displacement thereof. A deflection, for example, perpendicular to this direction is not disclosed or detected. When the sheet is slowly moved in front of the apparatus, this allows to scan it under near circular paths and also, through successive slight transverse shiftings, to sample it in any desired number of points and directions, which is of interest even when the structure of the sheet is directional. But it is more advantageous to fold each circular path up, thus examining a narrower strip of glass by obtaining the cross check at a time. For this purpose diaphragm plate 12 may have several small apertures so related that the trajectories of the rays from source 11 are caused to intersect at various angular relations by rotation of the prism.

FIG. 7 shows such a plate 12a in which several apertures are disposed in quincunx in two vertical columns. The separation or spacing between columns is equal to the spacing between apertures in each column, and the apertures in each column are offset in the direction of the columns, by a distance $D/2$ with respect to the apertures of the other column. The light rays traversing the respective apertures are deviated by prism 16a so that each describes a circular path in the plane of sheet P, FIG. 4. Thus, taking the same reference letters for the objects in 12a and their images in P, without considering their respective dimensions, the path of each ray passing the respective apertures such as $b$ in plate 12a, is quite a large circle with $b$ as a center. Another ray issuing from aperture $d$ is projected simultaneously upon the measuring screen in the same angular position with respect to $d$.

If we assume that drum 16 rotates clockwise, the beam of ray corresponding to $d$ is entering a square $cde$ when the one corresponding to $b$ is within it. Thus the several arcs identified at $t_1$, $t_2$, $t_3$, $t_4$ and $t_5$ are successively scanned by a different light beam because each corresponds to successive portions of a full circular path. These arcs are provided with radial slits in screen 15a as shown upon FIG. 8 so that each square such as $cde$ is successively explored five times in as many different directions, as if the circle were folded up. Each of these squares constitutes an independent unit. Several (four in FIG. 8) may be provided with their own Fresnel lens, photomultiplier and electronic circuit to scan a larger zone at a time.

If the object to be examined, such as a transparent sheet of material, is placed within the bundle of exploratory light rays, each zone thereof, corresponding to a respective one of the squares as previously identified will be successively explored for defects, by five arcs, all angularly related and each extending in a direction different from the others. In this way it is possible to determine for each zone or square, with sufficient and close accuracy, the maximum deviation which as previously explained, will enable evaluation of the degree of the corresponding maximum defect of prismatism or "lenticular power" of that zone.

Figure 7A:
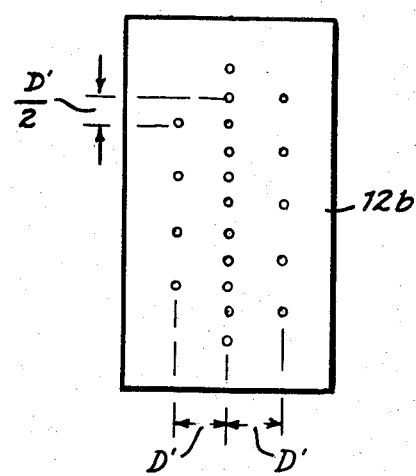
FIGURE 7a shows a second and preferred arrangement of apertures in a plate corresponding to that of FIGURE 7.

FIG. 7a shows an alternative and preferred form of apertured plate 12b. Here the apertures are disposed in three vertical columns. The spacing $D'$ between columns is equal to the spacing of the apertures in the two outside columns while the spacing between apertures of the central or middle column is equal to one-half the spacing between columns. Furthermore, as clearly shown, each aperture of the left column is opposite or at the same level as alternate ones of the apertures of the central column, for example, the 3rd, 5th, 7th, etc., aperture of the central column counting from top to bottom; while each aperture of the right column is directly opposite or at the same level as the 2nd, 4th, 6th, etc. aperture of the central column, also counting top to bottom.

The arcuate trajectories provided by this apertured plate and the rotation of prism 16a are shown upon FIG. 8a. In the absence of rotation of the prism, the light rays traversing the apertures in plate 12b would appear as spots of light at points a', b', c', d', etc. and which are the respective centers of the circular arcs within the squares or zones of examination as is clear from inspection of the figure. Each zone or square is thus explored by seven circular arcs. The directions of these arcs are more varied and dispersed than those forming the pattern of FIG. 8. For this reason the disposition of the apertures as shown upon FIG. 7a is especially favorable to accurate and reliable exploration of each zone of inspection.

FIG. 9 shows the circuitry which enables the signals from the electron multiplier and the magnetic band to be utilized to determine the prismatism and lenticular power of the transparent sheet under examination or, more precisely, to automatically ascertain if any selected point or area of the sheet has defects therein of the aforesaid nature, in excess of or above a certain maximum or permissible limit.

The negative signal of the electron multiplier is amplified and rendered more nearly linear to enable accurate utilization. For this purpose the amplified signal is applied over lead 31 to the grid of a triode 32 whose anode is connected to the control grid of a thyratron 33. When the signal is applied to the grid of triode 32, it acts to reduce the plate current thereof. The potential applied to and effective upon the grid of thyratron 33 is thus reinforced whereby there is obtained an amplified signal.

At the same time the amplified signal from the photomultiplier is applied from lead 31 to the grid of a triode 34 to block the functioning thereof, so that current from thyratron 33 charges capacitor 35. When the voltage of the capacitor has risen to a sufficient value, it stops further discharge from the thyratron. Triode 34 remains blocked during the period of the negative signal from the photomultiplier. At the termination of this signal the triode is unblocked and capacitor 35 discharges through triode 34.

FIG. 10 shows at a the wave form of the signal from the photomultiplier. At b is shown the form of the signal as applied to the thyratron, and at c the wave form of the output of the thyratron. This signal is differentiated by the element 36 consisting of a capacitor and resistor in series, and there is thus obtained as a derivative the signals represented at d, FIG. 10.

In calibrating the apparatus to correctly magnetize band 18, so that it will subsequently produce base or datum signals of the correct frequency, a standard or essentially perfect sheet of material is located at position P, FIG. 4. Switch 38, FIGS. 6 and 9 is closed. The signals developed in photomultiplier 22 are conveyed and applied at terminal 31 as previously described and shown at the left-hand portion of FIG. 9. Signals coming from differentiator 36 are applied to the grid of thyratron 37, in series with triode 40. The potential on the grid of this tube is applied through presently-closed switch 38, so that tube 40 is blocked and capacitor 37a discharges through the thyratron. The resulting signal is conveyed from output terminal 39 to the windings of electromagnets forming a part of inscription or pick-off head 19, where they act to induce magnetism in band 18. After calibration, switch 38 is opened and, in actual use, signals reproduced in head 19 by the magnetized band, are applied to the circuitry at terminal 41, shown at the lower left of FIG. 9.

Differentiator 36 has been previously identified. In actual use, the signal from this differentiator is produced as the result of the presence at position P, FIG. 4, of a sheet to be examined, and certain additional circuitry is required for the useful employment of these signals.

It is necessary that there be a time retardation. The defects of the sheet being examined, if any, may be disposed in any random sense so that the measuring signal may lead the basic signal, thus complicating their comparison. In order to avoid this difficulty, we systematically retard by a known time the measuring signal so that it occurs definitely after the datum or base signal.

The signal of differentiation from 36 unblocks a thyratron 42 which, in turn, charges capacitor 43. The discharge of this capacitor is controlled by a pentode 44 in such a way that this tube operates linearly. For this reason the potential at the cathode should be of the order of 75 volts in order to assure that the tube operates on the linear portion of its characteristic curve.

The variation of potential of capacitor 43 is applied to the cathode of a tube 45. The voltage on the grid of this tube may be regulated by a variable resistor 45a. At a certain instant the potential of capacitor 43 falls below that applied to the grid of tube 45. The tube then supplies a current which compensates for the discharged condition of the capacitor, so that a considerable time delay occurs before the capacitor is again fully charged by thyratron 42 and acts to block further conduction by tube 45.

FIG. 11 shows the characteristic discharge curve of capacitor 43. Point A is that corresponding to the signal from differentiator 36, which initiates charging of the condenser or capacitor. Point B represents the instant when tube 45 becomes conductive. The time difference between points A and B on the time scale is shown as a constant value, $\Delta t$.

The signal supplied by tube 45 is applied to a univibrator 46 of known type which transforms the signal into a rectilinear one smoothed by triode 48.

At this moment the juxtaposition of and comparison between the signal is initiated. The reference or base signal from the magnetic band, coming in by way of lead 41, is amplified by tubes 49 and 50, then differentiated by element 51. The resulting signal is then applied to univibrator 52 which gives it a form more nearly square, and finally applied to tube 53. The signal from triode 53 unblocks thyratron 54 which acts to charge capacitor 55. The discharge of this capacitor is rendered linear, as in the case of capacitor 43, by a pentode 54a whose cathode potential is at about $-75$ volts. The negative or standard signal of univibrator 46 controls a grid of pentode 54a in such a way that during the entire signal the pentode remains blocked.

The discharge curve of capacitor 55 shown upon FIG. 12, has a horizontal or dwell portion whose height above datum, or ordinate, depends upon the value of the negative signal from univibrator 46. As previously explained, the measuring signal effects a change in $\Delta t$ so that during the discharge of capacitor 55 the horizontal or dwell portion of the characteristic curve occurs at a certain distance below the peak thereof, as indicated upon FIG. 12.

When the sheet of glass to be examined is in position P, FIG. 4, and is substantially without defects, $\Delta t$ is controlled or regulated solely by the voltage corresponding to the aforesaid dwell portion of the curve, 75 volts for example. If the two signals compared, that is, the signals initiated by the photomultiplier and the magnetized band create a time lag, this is algebraically added to $\Delta t$ and the resulting position of the constant voltage or dwell portion of the discharge curve of capacitor 55 is correspondingly raised or lowered.

The discharge from capacitor 55 is filtered in order to eliminate therefrom all but the constant-voltage or dwell portions thereof. Thus, following capacitor 55 there is disposed a triode 56 whose cathode voltage corresponds to and follows precisely the instantaneous voltage of the capacitor. This voltage is applied to a pair of triodes 57 connected as shown at the upper part of FIG. 9. The grids of these tubes are connected with tube 48 so that they transmit only in response to a signal from rectifier tube 48. In this way there is obtained a signal which is due solely to the horizontal or dwell portion of the discharge curve of capacitor 55, and which is applied to grounded capacitor 58.

The signal thus obtained, due solely to the level or dwell portion of the discharge curve of capacitor 55 is applied to the grounded capacitor 58. These voltages are rendered usable by tube 59 connected into two circuits, one responsive to prismatic values of the sheet under test and the other to values of lenticular power thereof.

CONTROL OF DEFECTS DUE TO LENTICULAR POWER

The output from tube 59 is differentiated by element 60 and the resultant signals are conveyed to differential amplifier 61 which rectifies the negative signals and applies them to the grid of a thyratron 62 operating at such a level that it passes only signals having a voltage above an adjustable value, that is, a value corresponding to an unpermissible defect in lenticular power of the sheet being examined. Thus, as indicated upon FIG. 9, it is possible to utilize this signal to energize a relay which, in turn, gives a visual or audible signal or alarm, or automatically operates a device which will reject or eject from a production line the sheet under test. As an example only, a lamp 68 is shown which will be energized in response to an appropriate signal from thyratron 62.

In the form shown upon FIGS. 8 and 8a, wherein the sheet is examined along discrete arcs of circles, it may occur that the passage of the scanning ray or beam from one arc to the next, gives a false indication of lenticular power, that is, an indication of a non-existent defect. This is because measuring or testing is not carried out along the borders of the test areas or end points of the arcs.

For this reason current supplied by cathode tube 56 is used to recharge a capacitor 63 connected in parallel with a Zener diode 63a. As is known, such a diode has the characteristic of maintaining a constant voltage. In the present situation, this voltage is used to charge a capacitor 64 which, through triode 65, blocks the grid of tube 66 and renders it non-transmissive.

When the scanning beam arrives at the terminus of any given arc such as those depicted upon FIGS. 8 and 8a, the apparatus fails to recharge capacitor 63 which is discharged through resistances in series in its circuit. In such a situation capacitor 64 is discharged during a certain period and at a certain potential blocks triode 65 thus rendering tube 66 conductive and as a result a potential of 75 volts is applied to the grid of thyratron 62. The first signal which arrives to recharge capacitor 63, effects the reverse operation, that is to say, tube 66, again blocked by capacitor 64 and tube 65, removes from thyratron 62 the spurious potential of 75 volts corresponding to the absence of defects and which the apparatus would otherwise indicate. The capacity of 63 is so selected that tube 66 will be unblocked long enough for the disappearance of the first signal.

DEFECTS RESULTING IN PRISMATISM

The cathode current of tube 59 is conducted to a differentiating amplifier, smoothed by tube 67 and finally applied to the grid of thyratron 69 whose level of firing is controlled by a potential corresponding to the maximum permissible defects of prismatism. As in the case of lenticular power it is possible to utilize this current for energization of a relay which, in turn, may cause the lighting of signal lamp 70 or to operate means by which the sheet is automatically marked for ejection, or bodily ejected from a production line.

Neglecting amplification, filtering and smoothing, the principle of operation of the invention is summarized as follows:

(a) The time base is constituted by the rectilinear part of the voltage discharge curve of capacitor 55, rectified by a pentode wherein the horizontal portion of the characteristic curve is used to place the cathode of this tube at a negative potential for, for example, 75 volts and whose grids are stabilized. The discharge of the capacitor is brought about by the reference signal from the magnetic tape.

(b) The measuring signal is produced by the discharge of capacitor 43, perferably rectified by a pentode and recovered as a signal of a certain voltage.

(c) The time shift of the measuring signal effects a delay in the discharge of time base capacitor 55 and thus forms a corresponding horizontal or constant-voltage portion of the discharge curve thereof. The succession of these portions of the curve represent or are proportional to the defects for which the sheet is being tested.

(d) The discharge of the capacitor is filtered in order to eliminate all but the aforesaid horizontal or constant-voltage portions of the characteristic curve.

(e) In the absense of signals over a given period of time, a constant voltage is applied to the tube which controls the means for indicating defects of lenticular power.

Having now fully disclosed our invention, what we claim and desire to secure by Letters Patent is:

1. The method of measuring a slight deviation of a beam of light by an optical object, comprising projecting a beam of rays onto a light-responsive means, periodically intercepting said rays to obtain from said means a first pulse current, recording said first pulsed current, subsequently placing the object to be tested in said rays which are deviated in response to defects therein, periodically intercepting said subsequently deviated rays to obtain a second pulsed current and comparing said recorded first pulsed current with the said second pulsed current for measuring any phase difference between said first and second pulsed currents.

2. The method of testing a supposedly plane sheet of pellucid material for defects of prismatism and lenticular power, comprising, projecting a beam of parallel light rays around an axis onto a light-responsive means, interposing a calibrating sheet of pellucid material in and across said beam almost perpendicular to it, periodically intercepting the rays between said calibrating sheet and light-responsive means to obtain from the latter a first pulsed current, recording said first current, replacing said calibrating sheet with a pellucid sheet to be tested, periodically intercepting said rays traversing said sheet under test to obtain from said light-responsive means a second pulsed current of substantially the same frequency as said first current, comparing said first pulsed current in juxtaposition to said second pulsed current, and detecting any phase shift between said currents as a measure of defects above a permissible maximum in the sheet under test.

3. The method of testing for defects of light transmission, a sheet of glass, comprising, projecting a ray of light onto a light-responsive means, periodically intercepting said ray to obtain from said means a pulsed current of constant uniform frequency, recording said pulsed current, interposing a sheet of glass to be tested in and transversely across said ray to deviate the same in accordance with any defects of light transmission therein, comparing the recorded pulsed current of the undeviated ray and of the ray passing through the sheet and measuring any phase difference between the two pulsed currents as a measure of the degree of defect in the sheet of glass.

4. The method of testing for irregularities of a supposedly plane sheet of glass, comprising, projecting a beam of light rays along an axis, deflecting said rays at a point on said axis, at a small acute angle relatively thereto, rotating the deflected beam about said axis at known constant speed, placing an essentially perfect calibrating sheet of glass in and across said deflected rays, perpendicular to the axis, periodically intercepting said rays subsequently to traverse of the calibrating sheet and directing the same to a light-responsive device to generate a first pulsed current of constant frequency, recording said first current, substituting a second sheet of glass to be tested for the calibrating sheet, intercepting the rays traversing said second sheet as aforesaid, to obtain a second pulsed current of the same frequency as said first pulsed current, while synchronously reproducing the recorded first current, and comparing the two currents to detect any phase shift therebetween, as a measure of optical irregularities of the second sheet.

5. In an apparatus for testing a supposedly plane sheet of pellucid glass for surface irregularities, means operable to project at least a narrow beam of parallel light rays along an axis, rotatable deflector means positioned on said axis and operable to receive and deflect said rays at an angle to said axis, means to rotate said deflector means, a plate having slits radially of said axis and disposed in a circular path thereabout, to periodically intercept the rotating rays from said deflector means, light-ray responsive means, an optical element refracting said rotating rays after passage through said slits onto said light-ray responsive means, a band of magnetizable material, means moving said band in unison with rotation of said rotatable deflector means, a magnetizing and pick-off head fixed adjacent said band, and circuit connections between said light-ray responsive means and said head, and operable to magnetize said band in response to the pulsed current generated in said light-ray responsive means, to record said current.

6. The apparatus of claim 5, said deflector means comprising a prism, the angle of the prism being about 7°30′.

7. In an apparatus for testing the quality of a plane sheet of light-transmitting material, a light source, means for projecting a beam of light rays from said source along a first axis through such sheet, means for supporting such sheet in position extending across and substantially normal to said first axis, a photomultiplier positioned to receive said rays from such sheet, interceptor means between said source and photomultiplier and movable to periodically intercept said rays and thereby produce from said photomultiplier a first pulsed output current of constant frequency, means movable in synchronism with said interceptor means to record said pulsed current when no sheet to be tested is interposed in and across said rays, means to reproduce said pulsed current in juxtaposition to a second pulsed current of like frequency from said photomultiplier when a sheet to be tested is positioned in and across said axis between said source and interceptor means, and means receiving and comparing said two pulsed currents to detect any phase shift therebetween, as a function of any defects of quality of the sheet.

8. The apparatus of claim 7, said interceptor means comprising a disk having uniformly-spaced radial slots in and about its periphery and adapted to intercept said rays, in succession, said recording means comprising a drum connected with said interceptor means for rotation therewith, a magnetizable band secured to and about the periphery of said drum, an induction head fixed adjacent said band, and circuit connections between said photomultiplier and said head.

9. The apparatus of claim 7, said interceptor means comprising a plate fixed centrally of and across said first axis and having slits uniformly, circularly and radially arranged about said first axis, said plate being between said source and photomultiplier, a drum mounted for rotation about said axis, between said source and plate, and a prism fixed with said drum centrally thereof and effective to deflect said rays incident thereon, to the circle of said slits, and lens means rearwardly of said plate to refract said rays passing each said slit in succession, to incidence upon said photomultiplier.

10. The apparatus of claim 9, and an apertured plate interposed across said axis between said source and prism, said diaphragm having a plurality of regularly-spaced apertures therethrough, and through which rays from said source pass, said prism in response to rotation of said drum, picking up rays traversing said apertures and projecting the same onto said plate in a predetermined pattern of sequential discrete arcs, said plate having uniformly-spaced radial slits extending along respective arcs of said pattern.

11. The method of testing a sheet of plane transparent material for surface defects, defects of parallelism, and the like which comprises projecting a narrow beam of light along an axis, placing a test sheet in said beam substantially normal to said axis to permit light to pass therethrough, sequentially intercepting the rays passing through said sheet to produce a series of light pulses, detecting said pulses to produce a first signal, providing a second signal representative of an acceptable sheet, and comparing said first and second signals to determine the degree of deviation of the rays passing through the test sheet as a measure of a defect in the test sheet.

12. The method according to claim 10 in which the undeviated rays are recorded as a series of pulsations, and with the deviated rays are projected upon a receiver, and the magnitude of the defects in the sheet is determined by the degree by which the pulsations of the deviated record are offset from the pulsations of the undeviated record.

References Cited

UNITED STATES PATENTS 2,889,737   6/1959   Griss et al. _____ 88—14(G)
2,998,745   9/1961   McClellan _____ 88—14(G)

RONALD L. WIBERT, Primary Examiner

O. B. CHEW II, Assistant Examiner

U.S. Cl. X.R.

250—219

PO-1050
(5/69)

UNITED STATES PATENT OFFICE
CERTIFICATE OF CORRECTION

Patent No. 3,551,060          Dated December 29, 1970

Inventor(s) PETER SCHEFFLER and OTTO JANDELEIT

It is certified that error appears in the above-identified patent and that said Letters Patent are hereby corrected as shown below:

Column 10, line 25, change "pulse" to -- pulsed --; line 60, a comma (,) should appear after "sheet". Column 12, line 37, the claim reference numeral "10" should read -- 11 --.

Signed and sealed this 23rd day of March 1971.

(SEAL)
Attest:

EDWARD M. FLETCHER, JR.              WILLIAM E. SCHUYLER, JR.
Attesting Officer                    Commissioner of Patents